March 14, 1961 W. B. RETALLICK 2,974,750
DISTILLATION AND ABSORPTION PROCESS
Filed Feb. 13, 1958 2 Sheets-Sheet 1

William B Retallick
INVENTOR.

March 14, 1961 W. B. RETALLICK 2,974,750
DISTILLATION AND ABSORPTION PROCESS
Filed Feb. 13, 1958 2 Sheets-Sheet 2

INVENTOR.
BY
William B. Retallick

United States Patent Office 2,974,750
Patented Mar. 14, 1961

2,974,750

DISTILLATION AND ABSORPTION PROCESS

William B. Retallick, 128 Williams Ave., Canonsburg, Pa.

Filed Feb. 13, 1958, Ser. No. 715,070

2 Claims. (Cl. 183—115)

This invention relates to distillation and more particularly to the distillation process of stripping. Still more particularly, it applies to stripping when the stripping vapor is steam.

An object of the invention is to produce a stripper distillate which is substantially pure absorbate, by fractionating out the higher boiling components vaporized and carried over from the absorber medium. The same object is to prevent loss of the absorber medium to the distillate. Another object is to accomplish the same stripping with less steam. Still another object is to provide a means for fractionating the absorbate by withdrawing the higher boiling components therein as a separate product. Other objects and a fuller understanding of the invention may be had from the following description and claims, together with the drawings, of which:

Figure 1:
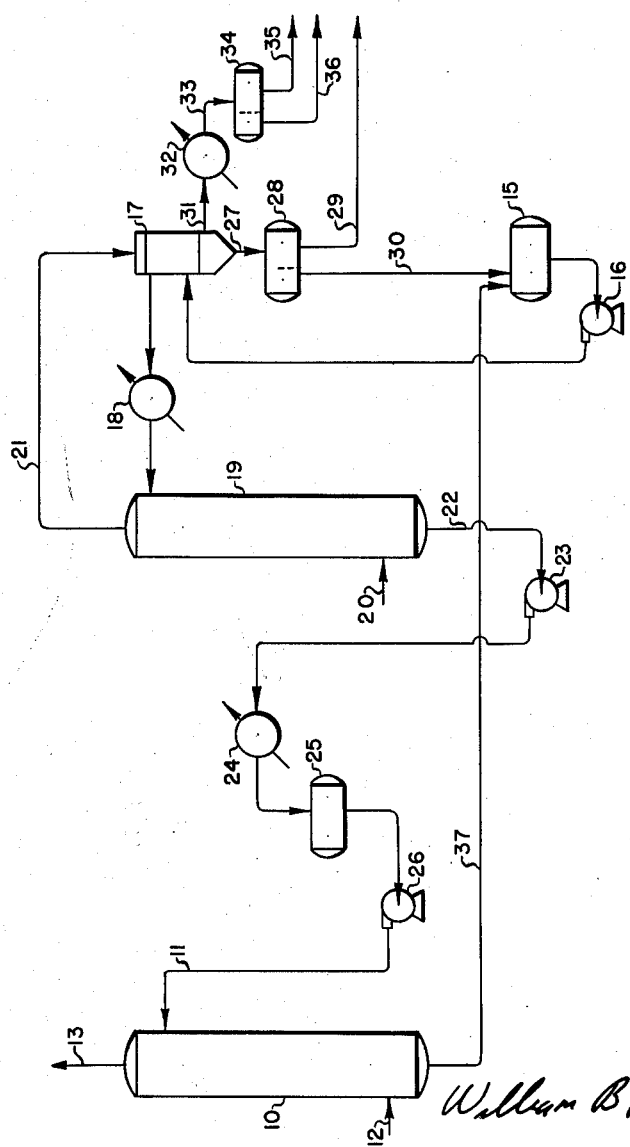
Figure 1 is a flow diagram for a conventional distillation process without the invention.

Figure 1 shows a conventional process in which this invention can be embodied. It is a simplified flow diagram for the absorber-stripper combination used in by-product coke plants to recover the liquefiable component known as light oil from the oven gas. This generalized flow diagram with or without the invention is not specific for coke plants since it can also be used to recover the liquefiable components from natural gas or any other gas. Furthermore, the invention is not limited to stripping as it is embodied in this flow diagram.

In Figure 1, 10 is an absorption tower or scrubber in which the cooled, stripped absorber medium in conduit 11, usually an oil, is contacted countercurrently with the rich gas in conduit 12. The stripped gas in conduit 13 leaves the top of absorber 10, while the rich oil in conduit 37 with the light oil absorbed in solution leaves the bottom of the absorber. The rich oil flows to surge tank 15, then to the top of the stripper 19 via pump 16, heat exchanger 17 and heater 18. Steam enters at the bottom of stripper 19 through conduit 20 and flows countercurrently to the heated absorber oil. The light oil absorbate is vaporized into the steam and leaves the stripper through conduit 21. The stripped absorber oil in conduit 22 returns to the absorber 10 via pump 23, cooler 24, surge tank 25, and pump 26.

As stated, one object is to remove vaporized absorber oil which otherwise would contaminate the light oil product and also represent a loss from the system. The conventional method is unsatisfactory because it effects only a partial removal and because it involves other complications which this invention avoids. According to the conventional method shown in Figure 1, the vapor stream in conduit 21 enters the vapor-oil heat exchanger 17 in which a partial condensation occurs. The condensation is controlled so that the condensate consists mainly of absorber oil, plus minor amounts of the higher boiling components of the light oil, plus about 40 to 80 percent of the steam. The condensate in conduit 27 from exchanger 17 enters decanter 28 wherein the water and oil phases are separated. The water condensate in conduit 29 is rejected, and the oil condensate in conduit 30 joins the rich absorber oil in surge tank 15. The uncondensed vapor in conduit 31 from heat exchanger 17 is condensed completely in condenser 32. The condensate in conduit 33 enters decanter 34 wherein the water and oil phases are separated. The water phase in conduit 35 is rejected and the oil phase in conduit 36 is the light oil product. In coke oven practice this condensate is known as crude light oil and is usually refined into other products. One of these products is a distillation residue which contains the absorber oil that was not condensed out in exchanger 17.

Another disadvantage of this conventional scheme is that the light oil which condenses in exchanger 17 is recycled to the stripper 19 with the main stream of absorber oil. Additional steam is required in the stripper 19 to revaporize this recycled light oil, which in turn, increases the amount of absorber oil vaporized and carried out of the stripper. An alternate arrangement of the conventional process is to recycle the oil condensate from exchanger 17 directly to the stripped absorber oil in conduit 22 returning to the absorber 10. The disadvantage of this arrangement is that any light oil contaminant in the recycled absorber oil reduces the efficiency of absorption.

Figure 2:
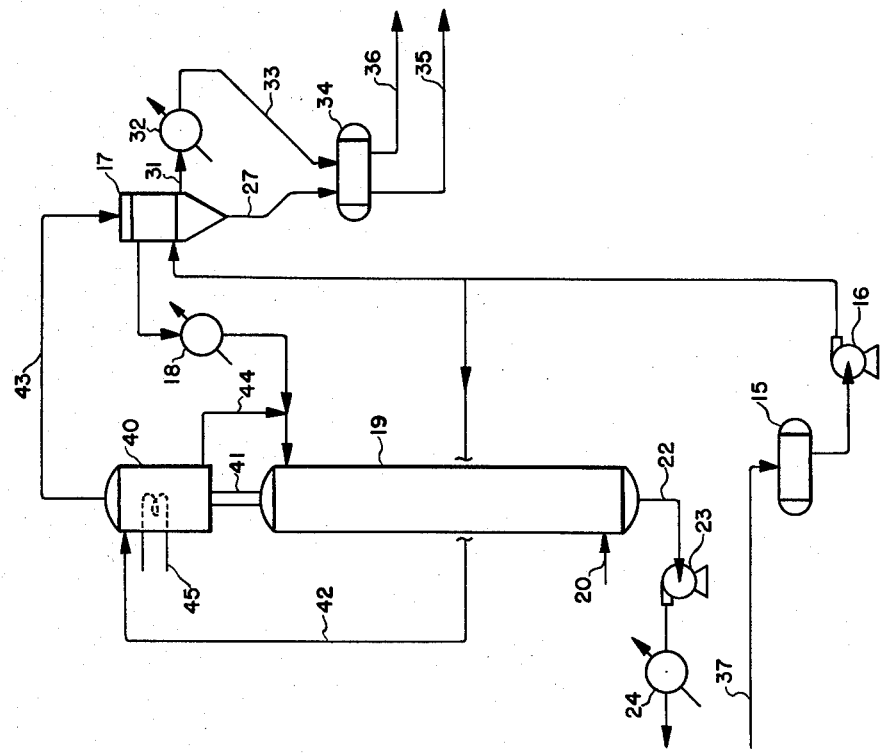
Figure 2 is a flow diagram of a process for the same purpose with the invention included.

Figure 2 shows one embodiment of the present invention for reabsorbing selectively the absorber oil vapor from the stripper vapor. The stripper vapor is condensed after this reabsorption step to yield a product of substantially pure light oil. In Figure 2, 40 is the reabsorber and the same numbers as in Figure 1 designate like streams and apparatus whose function is essentially unchanged. A small amount of the cold rich absorber oil is diverted from the main stream through conduit 42 and is refluxed to the top of the reabsorber 40, wherein it is contacted countercurrently with the stripper vapor in conduit 41. The amount of reflux in conduit 42 is regulated so that the temperature at the top of reabsorber 40 is just above the condensation temperature of the steam in the vapor effluent in conduit 43. This is the lowest possible temperature for the top of the reabsorber, and dictates the lowest possible vapor pressure for absorber oil where the final increment of reabsorption occurs. This final vapor pressure is much lower than at the higher temperature in the stripper, so that substantially all of the absorber oil vapor is reabsorbed from the stripper vapor before it leaves the reabsorber. At the reduced temperature at the top of the reabsorber the liquid phase may contain considerably more light oil than the rich absorber oil in conduit 37 going to the stripper 19. As will be shown later on by the examples in Table I, most of this light oil is stripped out and returned to the vapor before the reflux overflows to the stripper through conduit 44. In conventional distillation the reflux stream in conduit 42 would be a part of the light oil condensate in conduit 36, but this would be impossible in the present case. If the low boiling light oil were used as reflux, it would be impossible to maintain a stable liquid phase at the top of the reabsorber without condensing most of the steam, which would make the process inoperable. A dry liquid phase is maintained by refluxing with only enough absorber oil to cool the vapor effluent in conduit 43 to just above the condensation temperature of steam. At this reflux rate the liquid in the top stage of the reabsorber will contain just enough absorber oil to raise its boiling point above the condensation point of steam. It is practical to control the flow of reflux by the temperature in the top stage of the reabsorber 40.

Table I contains a series of examples to illustrate the operation of the reabsorber. Each example is based on 1000 gallons of rich or "benzolized" absorber oil in conduit 37 going to the stripper 19. As is usual in coke oven practice, the rich absorber oil contains about 2 per- In addition, there will be some naphthalene in the light oil but the amount differs between examples. It is conventional coke oven practice to strip the absorption oil with about 0.7 pound of steam per gallon of oil, so in most of the examples the vapor stream in conduit 41 going to the reabsorber will contain the above light oil components plus 700 pounds or 38.9 mols of steam. An

TABLE I

*Examples of operation of the reabsorber for examples 1 through 9—Reabsorption of absorber oil vapor*

Common Basis for all Examples:
  System Pressure 810 mm. of Mercury
  1000 gallons of benzolized absorber oil to stripper
  Absorber oil is as described in the text, Molecular Weight 325
  Composition of overhead vapors from reabsorber, mols—
    Benzene_____ 1.295
    Toluene_____ 0.325
    Xylene_____ 0.125
    Naphthalene (various)

| Example Number | 1 | 2 | 3 | 4 | 5 | 6 | 7 | 8 | 9 |
|---|---|---|---|---|---|---|---|---|---|
| Assumed Temperatures, °F.: | | | | | | | | | |
| Benzolized Absorber Oil to Stripper | 330 | 330 | 330 | 330 | 250 | 250 | 330 | 330 | 250 |
| Absorber Oil to Top of Reabsorber | 90 | 90 | 90 | 90 | 90 | 176 | 90 | 90 | 176 |
| Top Stage in Reabsorber | 220 | 220 | 220 | 200 | 220 | 220 | 220 | 200 | 220 |
| Assumed Flow Rates, Mols: | | | | | | | | | |
| Stripping Steam | 38.9 | 38.9 | 19.45 | 38.9 | 38.9 | 38.9 | 38.9 | 38.9 | 38.9 |
| Absorber Oil to Top of Reabsorber | 1.12 | 1.13 | 0.663 | 1.326 | 0.54 | 1.16 | 0.564 | 0.60 | 0.57 |
| Naphthalene in Overhead Vapors from Reabsorber | 0 | 0.034 | 0.034 | 0.068 | 0.034 | 0.034 | 0.034 | 0.068 | 0.034 |
| Absorber Oil Vaporized into Steam from Stripper | 0.06 | 0.06 | 0.06 | 0.06 | 0.06 | 0.06 | 0.06 | 0.06 | 0.06 |
| Heat Exchange Rates, B.t.u.: | | | | | | | | | |
| Total Heat for Cooling Stripper Vapors to Temperature in Top Stage of Reabsorber | 44,520 | 44,680 | 26,290 | 52,620 | 14,266 | 14,266 | 44,680 | 52,780 | 14,300 |
| Heat Removed indirectly by Cooling Coils in Top Stage of Reabsorber | 0 | 0 | 0 | 0 | 0 | 0 | 22,340 | 28,980 | 7,150 |
| Temperatures and Mols of Liquid Down Flow in the Stages of the Reabsorber: | | | | | | | | | |
| Top Theoretical Stage— | | | | | | | | | |
| Temperature, °F | 220 | 220 | 220 | 200 | 220 | 220 | 220 | 200 | 220 |
| Benzene | .021 | 0.022 | .0260 | .0402 | .0111 | .0221 | .0108 | .0182 | .0111 |
| Toluene | .012 | 0.012 | .0148 | .0224 | .0063 | .0127 | .0061 | .0101 | .0063 |
| Xylene | .011 | 0.012 | .0141 | .0249 | .0050 | .0119 | .0058 | .0122 | .0060 |
| Naphthalene | .0 | 0.037 | .0451 | .1397 | .0191 | .0382 | .0186 | .0636 | .0191 |
| Absorber Oil | 1.12 | 1.130 | 0.663 | 1.326 | 0.54 | 1.16 | 0.564 | .60 | 0.58 |
| Second Theoretical Stage— | | | | | | | | | |
| Temperature, °F | 281 | 279 | 280 | 250 | 247 | 235 | 308 | 298 | 246 |
| Benzene | .0089 | 0.0095 | .01135 | .01666 | .0074 | .0183 | .0034 | .00399 | .0078 |
| Toluene | .0049 | 0.0052 | .00635 | .00962 | .0042 | .0107 | .0018 | .00214 | .0044 |
| Xylene | .0048 | 0.0052 | .00635 | .00898 | .0044 | .0109 | .0017 | .00204 | .0046 |
| Naphthalene | 0 | 0.0101 | .03360 | .04430 | .0016 | .0570 | .0075 | .01514 | .0017 |
| Absorber Oil | 1.12 | 1.135 | .683 | 1.326 | 0.60 | 1.18 | 0.584 | 0.605 | 0.63 |
| Third Theoretical Stage— | | | | | | | | | |
| Temperature, °F | 313 | 312 | 318 | 285 | | | 325 | 323 | |
| Benzene | .0063 | 0.0063 | .0074 | .01035 | | | .0030 | .00322 | |
| Toluene | .0033 | 0.0034 | .0039 | .00560 | | | .0015 | .00166 | |
| Xylene | .0029 | 0.0031 | .0036 | .00542 | | | .0014 | .00149 | |
| Naphthalene | 0 | 0.0075 | .0154 | .03660 | | | .0044 | .00668 | |
| Absorber Oil | 1.16 | 1.150 | .723 | 1.331 | | | .624 | 0.66 | |
| Fourth Theoretical Stage— | | | | | | | | | |
| Temperature, °F | 325 | 325 | | 310 | | | | | |
| Benzene | .0056 | .0060 | | .00786 | | | | | |
| Toluene | .0029 | .0029 | | .00407 | | | | | |
| Xylene | .0025 | .0025 | | .00379 | | | | | |
| Naphthalene | 0 | .0058 | | .02175 | | | | | |
| Absorber Oil | 1.18 | 1.190 | | 1.366 | | | | | |
| Fifth Theoretical Stage— | | | | | | | | | |
| Temperature, °F | | | | 328 | | | | | |
| Benzene | | | | .00640 | | | | | |
| Toluene | | | | .00327 | | | | | |
| Xylene | | | | .00290 | | | | | |
| Naphthalene | | | | .01380 | | | | | |
| Absorber Oil | | | | 1.380 | | | | | | cent by volume of light oil so that upon stripping the yield of crude light oil will be:

| Component | Gallons | Pound Mols | Normal Boiling Point, °F. |
|---|---|---|---|
| Benzene | 13.81 | 1.295 | 176 |
| Toluene | 4.15 | 0.325 | 231 |
| Xylene | 1.84 | 0.125 | 289 | absorber oil is assumed which has an average molecular weight of 325, an API gravity of 33.5° at 60° F., and an average true boiling point around 690° F. For some examples the absorber oil will be preheated only to 250° F. before entering the stripper, while the preheat temperature will be 330° F. in the other examples. These temperatures include the usual range for coke oven practice. The higher temperature of 330° F. is above the usual practical range because of the high vaporization of absorber oil which would contaminate the product light oil. In the present case the crude light oil would contain about 12% of absorber oil without the cleanup accomplished by the reabsorber. Stripping is usually carried out at temperatures below 300° F. to control the contamination of absorber oil in the crude light oil, which usually varies from 3 to 5 percent. The higher temperature was assumed for most of these examples to show that the increased vaporization of absorber oil can be reabsorbed almost completely to produce a substantially uncontaminated light oil. An advantage of higher stripping temperature which has not been realized previously is that the amount of stripping steam can be reduced. A system pressure of 810 mm. of mercury, or about one p.s.i.g., was assumed for these examples, but the invention is operable over a range of pressures, both above and below atmospheric.

The following will explain the examples in Table I and will describe the particular type of operation each example illustrates.

Example 1 is the simplest case and illustrates the basic principle of operation. The mols of benzene, toluene, and xylene entering the reabsorber with the stripper vapor are summarized again at the top of Table I. In addition, the vapor contains 38.9 mols of steam and enters at the stripper temperature of 330° F. At 330° F. 38.9 mols of steam would vaporize 0.06 mol of absorber oil, which would amount to 12% contamination in the product light oil. The vapor effluent in conduit 43 from reabsorber 40 has this same composition, except that the absorber oil has been substantially removed and the vapor has been cooled to 220° F., which is just above the condensation temperature of the steam. The heat load for cooling the vapor mixture from 330° to 220° F., plus the load for condensing 0.06 mol of absorber oil is 44,500 B.t.u. This heat is picked up by the cold absorber oil reflux which enters at 90° F. and is heated substantially to the temperature of the entering stripper vapor. Since the weight of the reflux is much smaller than the weight of the vapor, the reflux will approach the temperature of the stripper vapor in just a few theoretical stages. In this example only four stages are required to heat the reflux to 320° F. and to strip out most of the light oil. The inlet temperature of the reflux is fixed arbitrarily, and the outlet temperature is closely defined by the temperature of the vapors from the stripper, so that the amount of reflux is defined by these two temperatures together with the stated cooling load. The course of the stripping and heating for each stage is given in Table I, together with the course of the reabsorption of the absorber oil, which is indicated by the increase of absorber oil in the liquid downflow.

Example 2 is exactly like the first example except that some naphthalene has been added to the stripper vapors. The point of this example is that even the higher boiling components such as naphthalene can be stripped out effectively over just a few stages in the reabsorber.

The change in Example 3 is that the amount of stripping steam has been cut in half while the other independent variables have remained unchanged. The point of this example is that the reabsorber is just as operable at the lower steam rate as at the higher rate. The amount of reflux has been decreased to suit the lower heat load. At the lower steam rate in this example the amount of absorber oil in the stripper vapor actually would be approximately halved, but the original 0.06 mol was assumed to show that the operation of the reabsorber is not limited by the amount of absorber oil to be reabsorbed.

Example 4 is a hypothetical case since the temperature in the top stage has been reduced arbitrarily to 200° F., which is below the condensation temperature of steam. However, the assumption was made that no steam would condense in order to illustrate a principle of operation. With this assumption, the reabsorber operates as before and does an effective reabsorbing job in four stages.

The point of Example 4 is that except for condensation of the steam, there is no practical lower limit to the temperature in the top stage. Another variation was introduced in this example in that the amount of naphthalene in the stripper vapors was doubled, but the naphthalene was effectively stripped out of the reflux in only four stages.

Example 5 illustrates an operation with a lower stripper temperature of 250° F. This lower temperature decreases the heat load to be picked up by the reflux, hence the amount of reflux used. This example shows that the reabsorber is perfectly operable at the lower temperature, and only two theoretical stages are needed. It was assumed that the amount of absorber oil vaporized into the stripper vapors would remain the same as for the higher stripper temperature, although it actually would be less, to provide a more severe test of the reabsorber under these conditions.

Example 6 is similar to 5 except that the temperature of the incoming reflux has been increased arbitrarily to 176° F. For the same heat load the amount of reflux is increased, together with the number of stages needed to strip out the light oil. The point of Example 6 is that within limits of temperature of the incoming reflux is unimportant, and a higher temperature can be compensated for only at the expense of some extra stages in the reabsorber. Therefore, the reflux flow can be controlled only by the temperature in the top stage so that the flow of reflux will increase automatically with its temperature.

Examples 7, 8 and 9 have in common that some of the heat load is removed indirectly by coils or the like in the top stage of the reabsorber, as shown in Figure 2 by number 45. An advantage of this is that the amount of reflux is reduced, together with the number of stages required to strip out the light oil. In each example, the amount of heat removed indirectly is about half of the total cooling load, but this is arbitrary. Theoretically, it might be possible to use no outside reflux at all, and to remove all of the heat indirectly in the top stage. Then the only internal reflux would be the small amount of absorber oil condensed out of the stripper vapors. Because of this small reflux, the reabsorber would lack the stability and resistance to upsets it would have with a larger downflow. The point of these examples is to show the feasibility of operating with a partial indirect heat removal. Each of these examples corresponds to one given previously, but with the addition of indirect heat removal, as follows:

Example 7 corresponds to Example 2.
Example 8 corresponds to Example 4.
Example 9 corresponds to Example 6.

Another object of this invention is to fractionate the absorbate so as to concentrate the higher boiling components, naphthalene in these examples, in a separate product relatively free of light oil. The means for accomplishing this object is discussed below and the embodiment is illustrated by Example 10 and Figure 3. In the previous examples, the naphthalene was stripped from the absorber oil and returned to the vapor effluent in conduit 43 together with the light oil. In this example, the naphthalene is concentrated at a point in the reabsorber from which it is removed as a side stream in admixture with absorber oil but relatively free of light oil. This preferential concentration of naphthalene is accomplished by an optimum choice of the temperature and flow rate of the absorber oil reflux and of the theoretical stage from which it is withdrawn as a side stream.

The optimum reflux temperature for any flow rate is just below the temperature in the top stage in the reabsorber, which is 220° F. in these examples. Accordingly, the reflux enters at 210° F. in Example 10. In an ordinary absorber such as 10 in Figure 1, it is desirable to feed the absorber oil at the lowest temperature possible, but in this reabsorber the temperature and flow rate are related by a heat balance around the stages extending down to the withdrawal stage. As a result, the maximum reflux temperature dictates the optimum combination of reflux rate and withdrawal stage. This optimum is developed in Table II as Case A. Table II shows that decreasing the reflux rate results in a lower temperature profile through a greater number of reabsorption stages so that for a constant amount of naphthalene in the overhead vapor, the amount withdrawn in the side stream per unit of reflux increases. In Case A about 3% of the light oil enters the side stream with the naphthalene but the ratio of naphthalene to light oil is increased by a factor of about 30 over what it would be in a single overhead product. Therefore the naphthalene can be recovered in concentrated form by stripping the side stream in a separate stripper. The reflux rate cannot be decreased indefinitely because the number of reabsorption stages increases rapidly below the 1.8 mols of reflux used in Case A and approaches infinity at 1.6 mols. The maximum reflux rate is below 5.0 mols, Case F, because the calculated heat absorption for Case F is 58,500 B.t.u., which is more than the total of about 45,000 B.t.u. available from cooling the stripper vapors to the temperature in the top stage, 220° F. The point is that Table II includes the full range of operable reflux rates at the optimum reflux temperature. In any operable case such as A, the residual heat load of about 33,000 B.t.u. would be absorbed by a stream of cold secondary reflux which enters the reabsorber just below the withdrawal stage. This small amount of secondary reflux is completely stripped of naphthalene, which is returned to the upper section of the reabsorber and recovered in the side stream. Alternately, the secondary reflux could be a part of the primary reflux which would overflow into the lower section of the reabsorber below the side stream withdrawal. Naphthalene carried down with this internal reflux would be stripped out and returned to the upper section, just as in the case of outside reflux. Table II shows that outside reflux is preferred, however, because it is advantageous to keep the primary reflux stream as small as possible.

Figure 3:
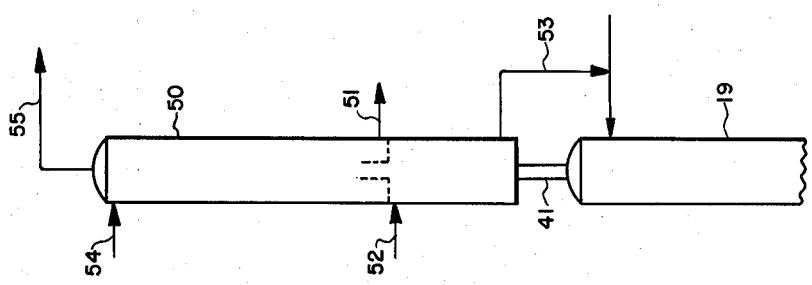
Figure 3 shows an embodiment of the invention particularly adapted to fractionating the absorbate.

Figure 3 shows one embodiment of the present invention for reabsorbing selectively the absorber oil vapor from the stripper vapor while selectively concentrating the naphthalene in a side stream. In Figure 3 the same numbers as in Figures 1 and 2 designate like streams and apparatus whose function is essentially unchanged. In Figure 3, 50 is the redesigned reabsorber with an upper section above the side stream, conduit 51, for concentrating the naphthalene and a lower section for absorbing the residual heat from the stripper vapors in conduit 41 with a secondary reflux stream which enters through conduit 52. The secondary reflux leaves reabsorber 50 through conduit 53 and joins the rich absorber oil entering the top of stripper 19, just as in Figure 2. The primary reflux, 1.8 mols at 210° F. as in Case A, enters the top of reabsorber 50 through conduit 54. The overhead vapor stream, substantially free of absorber oil and naphthalene, flows through conduit 55 to a condensing system as shown in Figure 2.

Table III illustrates the operation of the reabsorber in Example 10, Case A. The small temperature change between plates shows that the reflux rate is close to the practical minimum so that the concentration of naphthalene in the side stream is close to the maximum. The naphthalene increases rapidly near the top of the reabsorber, so that by taking slightly more naphthalene overhead a much greater amount could be concentrated in the side stream. The point is that the fractionating reabsorber is operable over a wide range of naphthalene concentrations in the stripper vapors in conduit 41. The conditions tabulated for a hypothetical ninth theoretical stage show that the maximum naphthalene concentration occurs in the eighth stage, so that for 0.002 mol of naphthalene in the overhead vapor in conduit 55, the most concentrated side stream is withdrawn from the eighth stage. The optimum withdrawal stage may vary with the amount of naphthalene in the stripper vapors in conduit 41, but it can always be located by calculation or by actual trial in practice. The optimum amount of reflux can be found quickly by calculation.

Table II

*Development of the optimum reflux rate to the reabsorber in Example 10*

Basis:
Reflux enters at 210° F.
Naphthalene in effluent vapors from reabsorber is 0.002 mols
Stripper temperature, 330° F.
Naphthalene from stripper varies between cases
Other bases same as in Table I

| Case | Mols of Reflux | Side Stream Withdrawal Stage | Temperature of Side Stream, °F. | Mols of Naphthalene In Side Stream | Total Mols of Benzene Toluene, and Xylene in Side Stream | Heat Absorbed by Reflux, B.t.u. |
|---|---|---|---|---|---|---|
| A | 1.8 | 8 | 244 | 0.0358 | 0.0526 | 11,700 |
| B | 2.0 | 6 | 246 | 0.0351 | 0.0520 | 13,650 |
| C | 2.3 | 6 | 255 | 0.0351 | 0.0554 | 18,150 |
| D | 3.0 | 4 | 263 | 0.0361 | 0.0678 | 28,300 |
| E | 4.0 | 3 | 258 | 0.0464 | 0.1020 | 35,100 |
| F | 5.0 | 3 | 275 | 0.0572 | 0.0979 | 58,500 |

TABLE III

*Temperatures and compositions in the reabsorber for Example 10—Case A*

```
Basis:
    Stripper Temperature_____ 330° F.
    Temperature of Reflux to Reabsorber___ 210° F.
    Reflux Rate_____ 1.8 Mols of Absorber Oil
    Other Bases same as in Table I.
Composition of Overhead Vapors from Reabsorber, mols:
    Benzene_____ 1.295
    Toluene_____ 0.325
    Xylene_____ 0.125
    Naphthalene_____ 0.002
    Steam_____ 38.9
```

| Theoretical Stage Number | Temperatures and Liquid Down Flows in Mols | | | | | | | | |
|---|---|---|---|---|---|---|---|---|---|
| | 1 | 2 | 3 | 4 | 5 | 6 | 7 | ¹8 | 9 |
| Temperature, °F | 220 | 226 | 230 | 234 | 237 | 239 | 242 | 244 | 246 |
| Benzene | 0.0334 | 0.0307 | 0.0291 | 0.0272 | 0.0260 | 0.0257 | 0.0250 | 0.0236 | 0.0220 |
| Toluene | 0.0190 | 0.0180 | 0.0171 | 0.0158 | 0.0154 | 0.0149 | 0.0142 | 0.0139 | 0.0129 |
| Xylene | 0.0180 | 0.0204 | 0.0193 | 0.0177 | 0.0171 | 0.0165 | 0.0157 | 0.0151 | 0.0138 |
| Naphthalene | 0.0034 | 0.0078 | 0.0133 | 0.0190 | 0.0247 | 0.0296 | 0.0331 | 0.0358 | 0.0338 |
| Absorber Oil | 1.8 | 1.8 | 1.8 | 1.8 | 1.8 | 1.8 | 1.8 | 1.8 | 21.8 |

[1] As shown in Table II, this is the optimum side stream withdrawal stage.
[2] Amount of absorber oil is substantially constant between stages above the side stream withdrawal stage because most of the reabsorption of absorber oil occurred below the side stream withdrawal.

The downflow of absorber oil was assumed constant at 1.8 mols in Example 10 because most of the absorber oil vapors in conduit 41 will have been reabsorbed in the lower section of the reabsorber below side stream in conduit 51. Of course, any residual vapors will be reabsorbed in the upper section, just as in the first nine examples.

The effectiveness of the reabsorber for removing absorber oil vapor from the stripper vapors to produce an uncontaminated light oil product is the same in all ten examples. This effectiveness is defined by the vapor pressure of the absorber oil at the temperature in the top stage of the reabsorber divided by the vapor pressure at the stripper temperature. For the absorber oil used in these examples, the approximate vapor pressures are as follows:

| Temperature, °F.: | Vapor pressure, mm. of mercury |
|---|---|
| 220 | 0.023 |
| 250 | 0.075 |
| 330 | 1.2 |

Then the fraction of the absorber oil in the stripper vapor 41 which remains in the vapor effluent in conduits 43 or 55 is only $$\frac{0.023}{1.2}$$

or 1.9 percent when the stripper temperature is 330° F. Accordingly, the contamination of absorber oil in the light oil is reduced from 12 percent to about 0.3 percent. For different absorber oils the absolute vapor pressures will vary, but the efficiency of clean up in the reabsorber will be about the same. The same high efficiency of clean up will prevail also when the temperatures are raised or lowered by operating the stripper-reabsorber combination under moderate pressure or vacuum. This efficient clean up will permit the use of absorber oils with lower molecular weights and higher vapor pressures. The advantage of such oils, which has not been realized in the past, is that they have greater absorption capacity per volume circulated.

Table I shows that for most examples only about four theoretical stages are needed to give substantially complete stripping of the absorber oil reflux. It will be understood, however, that in practice it may be advantageous to obtain complete stripping for the small expense of adding more stages to the reabsorber, which would also make it more immune to upsets. Figures 1 and 2 show the reflux as being taken from the benzolized absorber oil stream, but it is immaterial whether stripped or benzolized oil is used. The examples have shown that part of the heat load for cooling the stripper vapors can be absorbed indirectly with coils or a similar means. In general, however, I prefer to omit the indirect cooling means and absorb all of the heat with liquid reflux because this should involve simpler apparatus and should be easier to control.

The vapor-liquid contacting in the reabsorber can be effected with any conventional means such as packing or bubble cap trays. Bubble cap trays are preferred for the reabsorber because they more positively retain a pool of liquid in each stage, despite the low ratio of liquid downflow to vapor upflow.

This specification has been written around a process and chemical substances normally used in coke oven practice, but the invention is not limited to these. It can be applied equally well to the practice in petroleum refineries, natural gasoline plants and chemical plants, for example. Furthermore, in some applications of this invention the absorber medium need not be an oil. It can equally well be a chemical solution such as ethanolamine or glycol, which are often used for absorbing acid gases or water vapor.

What I claim is:

1. The method of reabsorbing selectively the vapors of absorber medium from the vapors of the absorbate in the steam-vapor mixture from a still for stripping said absorbate from said absorber medium while simultaneously concentrating at least a part of the higher boiling components of said absorbate as a side stream in admixture with absorber medium, but substantially free of the lower boiling components of said absorbate, comprising passing said steam-vapor mixture through a reabsorber, delivering absorber medium at a temperature below that of said entering steam-vapor mixture into the top of said reabsorber, removing cooled steam-vapor mixture, substantially free of absorber medium vapor, from the top of said reabsorber, removing at least a part of the absorber medium, in admixture with at least a part of the higher boiling components of said absorbate from said reabsorber at a point intermediate its height, and removing the remaining absorber medium from the bottom of said reabsorber at a temperature approaching that of said entering steam-vapor mixture.

2. The method set forth in claim 1 wherein supplementary absorber medium is delivered into said reabsorber at a point below the withdrawal point of said side stream.

References Cited in the file of this patent
UNITED STATES PATENTS

| | | |
|---|---|---|
| 2,126,367 | Clawson et al. | Aug. 9, 1938 |
| 2,236,964 | Babcock | Apr. 1, 1941 |
| 2,241,717 | Robinson et al. | May 13, 1941 |
| 2,710,663 | Wilson | June 14, 1955 |
| 2,762,453 | Alexander | Sept. 11, 1956 |
| 2,815,650 | McIntire | Dec. 10, 1957 |